(12) United States Patent
Suzuki

(10) Patent No.: US 7,072,574 B2
(45) Date of Patent: Jul. 4, 2006

(54) METHOD AND APPARATUS FOR RECORDING AND PLAYING BACK MOVING PICTURE DATA

(75) Inventor: Yoshinori Suzuki, Urawa (JP)

(73) Assignee: Hitachi, Ltd., Tokyo (JP)

( * ) Notice: Subject to any disclaimer, the term of this patent is extended or adjusted under 35 U.S.C. 154(b) by 1155 days.

(21) Appl. No.: 09/796,612

(22) Filed: Mar. 2, 2001

(65) Prior Publication Data

US 2002/0106198 A1   Aug. 8, 2002

(30) Foreign Application Priority Data

Feb. 5, 2001   (JP)   ............... 2001-027842

(51) Int. Cl.
*H04N 7/26* (2006.01)
*H04N 5/91* (2006.01)

(52) U.S. Cl. .......................... 386/111; 386/68

(58) Field of Classification Search ............... 386/111, 386/109, 112, 27, 33, 125, 124, 68, 67, 45, 386/40, 6, 7
See application file for complete search history.

(56) References Cited

U.S. PATENT DOCUMENTS 5,377,051 A * 12/1994 Lane et al. .................... 386/81

FOREIGN PATENT DOCUMENTS

JP   P.N.2000-013791   *   1/2000
JP   P.N.2000-270333 A   *   9/2000

OTHER PUBLICATIONS

L. Soares, et al "MPEG-4: A Flexible Coding Standard for the Emerging Mobile Multimedia Applications", Personal, Indoor and Mobile Radio Communications, 1998. The Ninth IEEE International Symposium on Boston, Sep. 8-11, 1998, pp. 1335-1339.

Information Technology-Coding of Audio-Visual Objects: Visual ISO/IEC, 14496-2, International Organization for Standardization—Organization, No. N2202, Mar. 1998, pp. 1-329.

Overview of the MPEG-4 Standard ISO/IEC JT1/SC29/WG11 N3747, Oct. 2000, pp. 1-60.

Miki, et al, "Error Resilience Features of MPEG-4 Audio Visual Coding and Their Application to 3G Multimedia Terminals" IEEE, vol. 1, Aug. 21, 2000, pp. 805-808.

Samata, et al "A New Chip/IP Core Set for 3G-324M Video Telephony", VTC 2000-Spring, 2000 IEEE 51st Vehicular Technology Conference Proceedings, May 15-18, vol. 1 of 3, Conf. 15, pp. 279-282.

Japanese Unexamined Patent Publication No. 2000-013791.

* cited by examiner

*Primary Examiner*—Robert Chevalier
(74) *Attorney, Agent, or Firm*—Mattingly, Stanger, Malur & Brundidge, PC

(57) ABSTRACT

A terminal apparatus for efficiently recording an arbitrary scene into a memory of a relatively small capacity while decoding a received bitstream of a moving picture coded data sequence to display reconstructed moving pictures, wherein an arbitrarily selected decoded picture is stored as a virtual intra-frame coded picture, and a partial bitstream for producing moving pictures of a specific period subsequent to the selected decoded picture is recorded as recorded data. The recorded data is decoded in response to a playback request by using the virtual intra-frame coded picture as an initial picture.

20 Claims, 11 Drawing Sheets

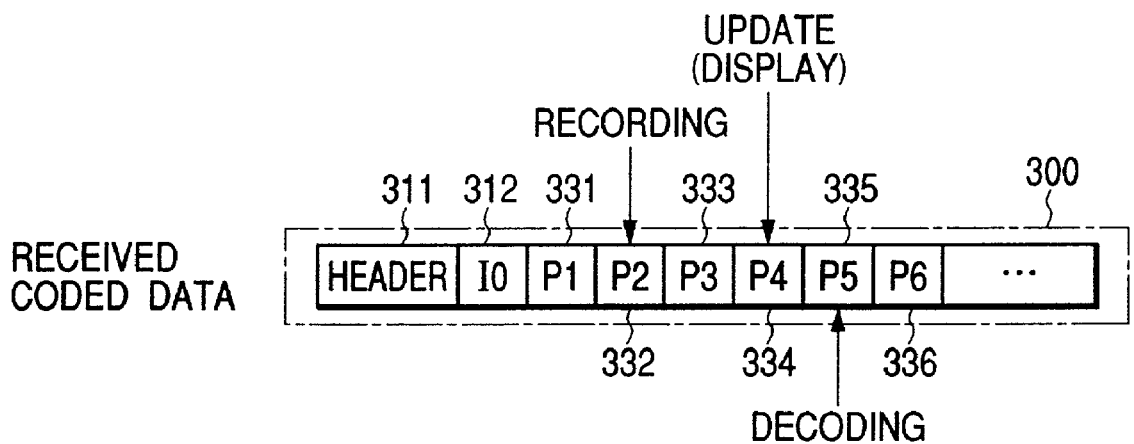
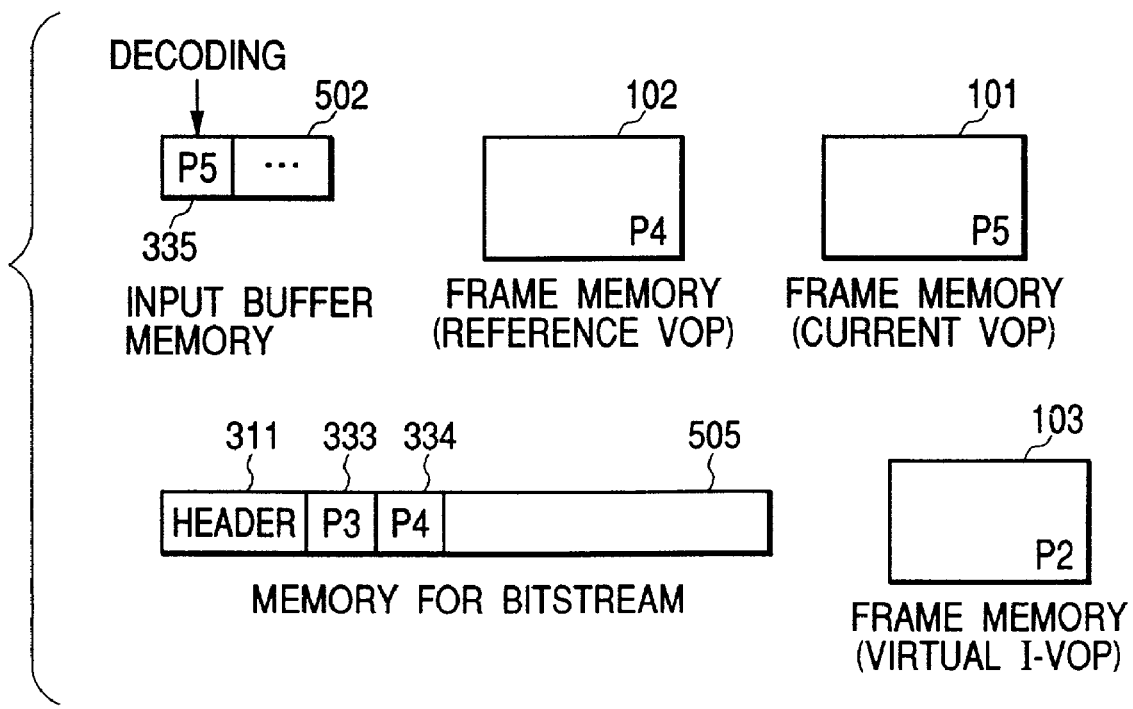

METHOD AND APPARATUS FOR RECORDING AND PLAYING BACK MOVING PICTURE DATA

BACKGROUND OF THE INVENTION

1. Field of the Invention

The present invention relates to a method and apparatus for recording and playing back moving picture data and, more particularly, a method and apparatus for recording and playing back moving picture data adapted to partial recording of a digital video moving picture data sequence to which intra frame coding is not applied so frequently.

2. Description of the Related Art

In an application of distributing a digital moving picture simultaneously to an indefinite number of users in a real-time manner like digital broadcasting, a data structure that each of terminals can instantaneously start a process of decoding received moving picture data, that is, a coded data (bitstream) format which can be decoded from arbitrary time is adopted.

FIG. 2 shows a data structure of the MPEG system as an example of a moving picture bitstream in digital broadcasting. In the MPEG system, three kinds of coding systems called intra frame coding, inter frame coding, and bidirectionally predictive video coding are defined.

The "intra frame coding" is a data compression method of directly performing DCT (Discrete Cosine Transform) on a picture of a current frame. A frame to which the intra frame coding is applied is called an I-VOP (Intra-coded Video Object Plane) in MPEG-4 and an I-Picture in MPEG-2. "VOP" is a synonym of "frame" in a rectangular picture. Since an I-VOP does not require decoding information of a preceding frame at the time of coding and decoding, it is used as a decoding start frame when a coded moving picture is accessed at random.

The "inter frame coding" is a coding method of compressing data of a frame by using coded information of a frame which is preceding the object frame with respect to time. A frame to which the inter frame coding is applied is called a P-VOP (Predictive-coded VOP) in MPEG-4 and a P-Picture in MPEG-2. The "bidirectionally predictive video coding" is a method of compressing data of a frame by using coded information of two frames which are preceding and subsequent to the frame with respect to time. A frame to which the bidirectionally predictive video coding is applied is called a B-VOP (Bidirectionally predicted-coded VOP) in MPEG-4 and a B-picture in MPEG-2.

In the following description, it is assumed that a data structure of an MPEG-4 bitstream is used, and reference characters I, P, and B in the drawings denote I-VOP, P-VOP, and B-VOP, respectively.

An MPEG bitstream shown in FIG. 2 has a data structure in which header information 201 showing characteristics of a whole sequence such as a bitstream size and an I-VOP 202 are periodically inserted. By using the data structure, for example, even when an operation of receiving a bitstream is started from a data portion 203 constructed by P-VOPs and B-VOPs surrounded by broken lines, by waiting for the subsequent header information 201 and the I-VOP 202 on the terminal side, a process of decoding the received data can be started. According to the data structure, therefore, by setting the size of the data portion 203 to a degree that the user is not annoyed by waiting time, moving picture delivering service which is instantaneously provided to each user can be realized.

In digital broadcasting of which service has just started recently, the header information 201 of the MPEG-4 is constructed by, for example, as shown in FIG. 3, a VOS header 201-1, a VO header 201-2, a VOL header 201-3, and a GOV header 201-4.

The VOS header 201-1 includes profile level information for determining an application range of an MPEG-4 product. The VO header 201-2 includes version information of the MPEG-4. The VOL header 201-3 includes information such as picture size, a coding bit rate, a frame memory size, and an application tool, which is indispensable to decode received data. The GOV header 201-4 includes time information used for reserved playback and the like.

The data structure in which the header information 201 and the I-VOP 202 are periodically inserted is effective for video recording and random access to recorded data. For example, in video recording, by a analyzing the header information 201 which appears first after the user presses a recording start button, subsequent data can be recorded. Since an MPEG decoder does not deteriorate the quality of a whole decoded picture sequence even when a process of decoding a B-VOP or B-picture is skipped, by frequently inserting the B-VOP to the data portion 203, fast forward, quick motion playback, and the like of recorded data is facilitated.

In real-time communication using a radio channel, it is difficult to frequently insert the I-VOP into a bitstream due to limitations of transmission delay, communication capacity, data transmission error, and consumed power. Consequently, in video streaming service on demand using a radio channel as a precondition, for example, as shown in FIG. 4, coded data in which usage of the I-VOP is avoided as much as possible has to be used.

The coded data shown in FIG. 4 has, different from FIG. 2, a data structure in which a long data sequence 313 consisting of a number of continuous P-VOPs is disposed after header information 311 and an I-VOP 312. In this case, it is general to insert intra-coded blocks in a P-VOP sequence to correct a transmission error. The intra-coded block plays a role of refreshing the picture quality of a block deteriorated by a transmission error. In the case of the MPEG, one VOP is divided into a plurality of blocks each having a size of 16×16 pixels, and the position of a current coding block is periodically changed so as to refresh all the coding blocks in several VOPs. In the video streaming service, for example, as shown in FIG. 5, there is a case that the header information 311 is constructed by a VOS header 311-1, a VO header 311-2, and a VOL header 311-3 and includes no GOV header.

When the frequency of inserting the I-VOP into a bitstream is reduced, the size of the data portion 313 following the I-VOP becomes large. It consequently causes a problem such that, even in the case where only a specific part in a received stream (coded data sequence) is desired to be recorded on a terminal side, in practice, a number of unnecessary groups of frames received since the I-VOP until a desired picture frame have to be also recorded.

For example, when it is assumed that the bitstream shown in FIG. 4 is moving picture data of three minutes, even when the user wishes to record moving pictures of only 15 seconds positioned at the last part of the bitstream, the whole bitstream from the header 311 and the I-VOP 312 indispensable for decoding to the target picture frames has to be recorded. For example, in a terminal having therein a memory of a small capacity, such as a cellular phone, even if the user wishes to selectively record a specific stream portion selected from received moving pictures, there is the possibility that the built-in memory becomes full before the target stream portion arrives, so that the recording fails. In order to record a partial stream including desired picture frames with reliability, it is necessary to preliminarily connect an external storage having a sufficient memory capacity to the terminal.

SUMMARY OF THE INVENTION

An object of the invention is to provide a method for recording and playing back moving picture data, adapted to a terminal apparatus having a memory of a relatively small capacity.

Another object of the invention is to provide a method for recording and playing back moving picture data, capable of recording a picture stream of an arbitrary portion extracted from a moving picture coded data sequence to which intra frame coding is not applied so frequently into a memory of a relatively small capacity.

Further another object of the invention is to provide a terminal apparatus capable of recording and playing back a picture stream of an arbitrary portion in a moving picture coded data sequence to which intra frame coding is not applied so frequently.

To achieve the objects, according to the invention, an arbitrarily selected decoded picture is stored as a virtual intra-frame coded picture while a received moving picture coded data sequence (bit stream) is decoded to display reconstructed pictures, and a partial bitstream capable of producing reconstructed pictures of a specific period subsequent to the decoded picture dealt as said virtual intra-frame coded picture is recorded as video recording data.

According to the invention, by using the virtual intra-frame coded picture as initial data, a bit stream of subsequent frames recorded as video recorded data can be decoded one after another and displayed as reconstructed pictures. The virtual intra-frame coded picture may be stored in the form of coded data obtained by re-coding a decoded picture. The virtual intra-frame coded picture is selected basically at a timing the user designates the video recording, thereby recording a scene desired by the user among displayed moving pictures.

In a preferred embodiment of the invention, in order to avoid a delay of a recording start timing due to a delay of user's operation and a delay in response to a user instruction, a terminal apparatus which is reconstructing received moving pictures operates in a preliminary recording mode of periodically updating the virtual intra-frame coded picture in a predetermined cycle and newly recording a partial received bitstream each time the virtual intra-frame coded picture is updated. When the user designates the video recording during the preliminary recording mode, the operation of the terminal apparatus is changed to a regular recording mode in which the operation of updating the virtual intra-frame coded picture is suppressed to continue the operation of recording the received bitstream. The regular recording mode is finished when the user instructs a recording end or when a memory for recording becomes full. By properly setting the cycle of updating the virtual intra-frame coded picture, bitstream data can be recorded from a scene desired by the user with reliability.

In a general MPEG-4 decoder using only I-VOPs and P-VOPs, two frame memories are prepared. A decoding process on a frame unit basis is executed by using one of the frame memories for a reference VOP in a motion predicting process and using the other for a current VOP. The usage of the memories are alternately switched every decoding cycle. In this case, a decoded picture stored in the frame memory for reference VOP is erased by being overwritten with a new decoded picture in the next decoding cycle.

In a first embodiment of the invention, to instantaneously store a decoded picture stored in the frame memory for reference VOP as a virtual intra-frame coded picture (hereinbelow, called a virtual I-VOP) for an arbitrary period, a third frame memory is added to the MPEG decoder. In normal times, by alternately switching two frame memories assigned for a reference VOP and a current VOP, a received bitstream is decoded on the frame unit basis. At the timing of updating the virtual I-VOP, the frame memory used for reference VOP is switched to that for the virtual I-VOP, and the frame memory used for the virtual I-VOP so far to that for the current VOP. With the configuration, without transferring picture data between the frame memories, a decoded picture can be instantaneously stored as a virtual I-VOP and a subsequent frame can be decoded. A partial received bitstream capable of reconstructing the pictures of a specific period subsequent to the virtual I-VOP is stored in a bitstream memory as a recording memory. In the embodiment, playback of recorded pictures can be achieved by switching the frame memory for the virtual I-VOP so as to be used for the reference VOP and supplying coded data read out from the bitstream memory to the MPEG decoder.

In a second embodiment of the invention, in place of the third frame memory, an MPEG coder is used. At the timing of updating the virtual I-VOP, a reference VOP stored in the frame memory for reference VOP is supplied to the MPEG coder. Picture data coded by the MPEG coder is stored in the bitstream memory. Consequently, in the second embodiment, all of the virtual I-VOP and subsequent pictures are stored as coded data into the bitstream memory. At the time of playback of a recorded picture, the coded data read out from the bitstream memory is sequentially supplied to the MPEG decoder.

BRIEF DESCRIPTION OF THE DRAWINGS

FIG. 7 is a diagram showing an example of a received bitstream 300 processed by the moving picture data processing system.

FIG. 8 is a diagram showing a state of a memory of the moving picture data processing system in a cycle of decoding a P5 frame in the received bitstream 300.

DESCRIPTION OF THE PREFERRED EMBODIMENTS

Embodiments of the invention will be described hereinbelow with reference to the drawings.

Figure 6:
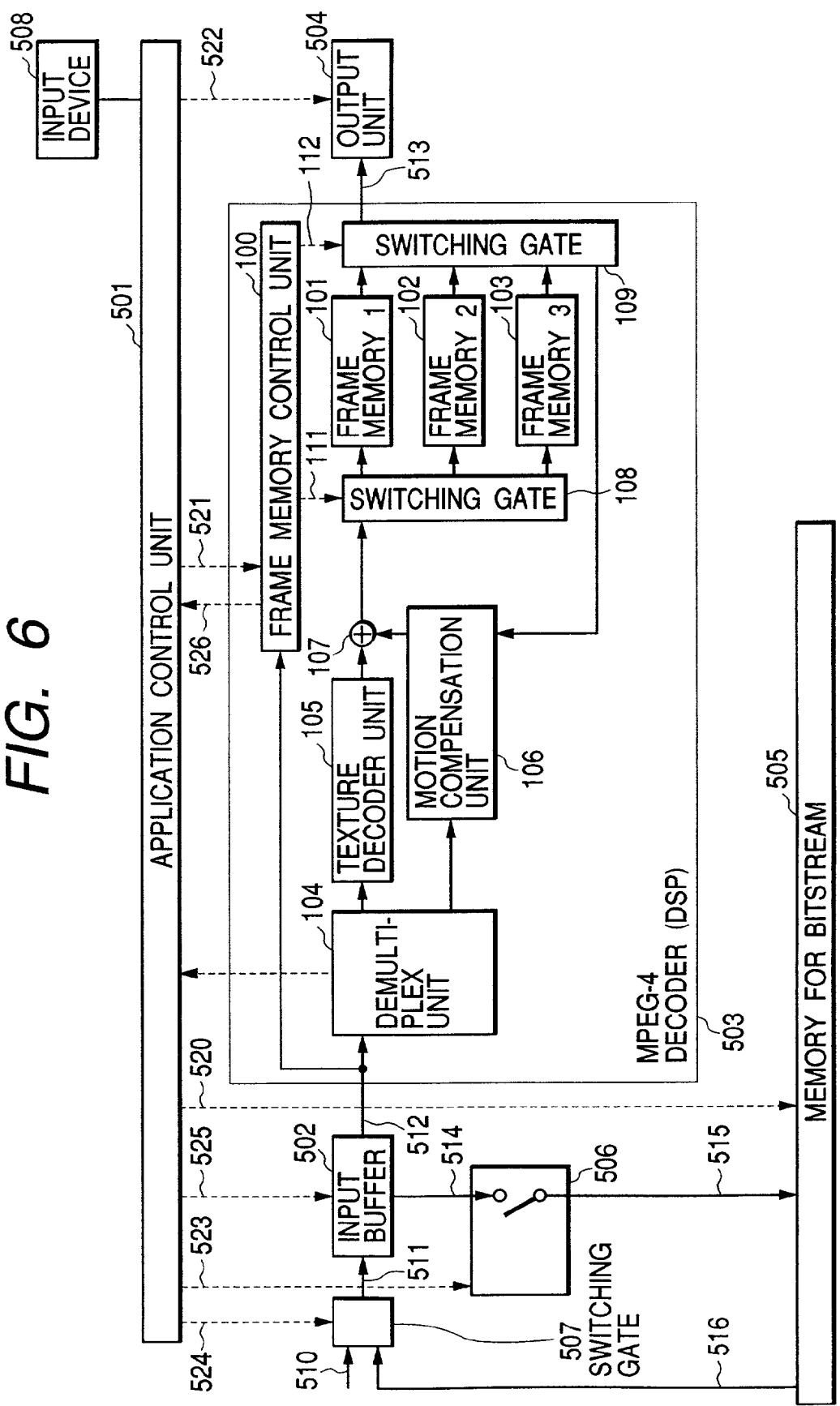
FIG. 6 is a diagram showing a moving picture data processing system according to another embodiment of the invention.

FIG. 6 shows a moving picture data processing system according to a first embodiment of the invention, to be mounted on a radio communication terminal such as a cellular telephone.

The embodiment is characterized in that an MPEG-4 decoder 503 has not only a frame memory for reference VOP and a frame memory for current VOP but also a third frame memory for storing a virtual I-VOP. In a radio communication terminal having a microprocessor for executing various application software (programs) and a DSP (Digital Signal Processor) for processing moving picture data, the function of the MPEG-4 decoder 503 can be realized by data processing of a DSP. Although the moving picture data processing system in which the MPEG-4 decoder 503 is realized by a DSP will be described, the function of the MPEG-4 decoder 503 may be realized by a dedicated LSI or software using a data processing function of the microprocessor.

Shown in the diagram are an application control unit (microprocessor) 501, an input buffer memory 502 for temporarily storing received coded data (bitstream) the MPEG-4 decoder 503, a decoded VOP output unit 504 taking the form of a liquid crystal display or the like, a bitstream memory 505 for storing a part of a delivered moving picture, a switch 506 for controlling stored data, a switching gate 507 for selecting input data, and an input device 508 having various input buttons to be operated by the user. The MPEG-4 decoder 503, output unit 504, bitstream memory 505, switch 506, and gate 507 are controlled by control signals 521, 522, 520, 523, and 524 output from the application control unit 501, respectively. The input buffer memory 502 is cleared by a control signal 525 output from the application control unit 501.

In a received moving picture output mode of decoding a delivered moving picture and outputting decoded data to a display screen, the switching gate 507 selects moving picture coded data (bitstream) output from a radio receiving circuit (not shown) and supplies the data to the input buffer memory 502 via a path 511. The moving picture coded data temporarily stored in the input buffer memory 502 is sequentially read out and supplied via paths 512 and 514 to the decoder 503 and the switch 506. The switch 506 is on/off controlled by the control signal 523 and, when the switch 506 is on, coded data is supplied to the bitstream memory 505 via a path 515. Writing and reading out of data to and from the bitstream memory 505 is controlled by the control signal 520.

The MPEG-4 decoder 503 includes first, second, and third frame memories 101, 102, and 103, a frame memory control unit 100, a demultiplex unit 104 for analyzing coded data supplied from the path 512, a texture decoder unit 105, a motion compensation unit 106, an adder 107 for adding the output of the texture decoder unit 105 and the output of the motion compensation unit 106, a first switching gate 108 for selectively supplying the output of the adder 107 to the first, second, and third frame memories 101 to 103, and a second switching gate 109 for selectively supplying outputs of the first, second, and third frame memories 101 to 103 to the output unit 504 and the motion compensation unit 106. The frame memory control unit 100 supplies control signals 111 and 112 to the first and second switching gates 108 and 109, respectively, to switch input and output of data to and from the frame memories 101 to 103 in response to the control signal 521 from the application control unit 501.

The demultiplex unit 104 analyzes coded data supplied from the path 512 and detects header information. Coded data supplied during a period from start of the analyzing operation until detection of the first header information is discarded. The demultiplex unit 104 extracts a picture size and time precision information from each header information detected and transfers the extracted information to the application control unit 501. The demultiplex unit 104 also analyzes a series of VOP data supplied subsequent to the header information in accordance with the data structure unconditionally determined from application tool information included in the VOL header and allocates time relevant information, error relevant information, and motion relevant information extracted from each VOP data to the application control unit 501, texture decoder unit 105, and motion compensation unit 106, respectively.

In the MPEG-4 decoder 503, coded data is supplied to the demultiplex unit 104, and error information and motion information extracted from each VOP is delivered to the texture decoder unit 105 and the motion compensation unit 106, respectively. A VOP decoding cycle is now assumed in which the first frame memory 101 is assigned for a current VOP, the second frame memory 102 is assigned for a reference VOP, and the third frame memory 103 is assigned for a virtual I-VOP. In the second frame memory 102 for reference VOP, VOP data decoded in a preceding cycle is stored.

The frame memory control unit 100 switches the switching gate 109 so that the reference VOP stored in the second frame memory 102 is supplied to the motion compensation unit 106 and the output unit 504, and controls the switching gate 108 so that a decoded VOP signal output from the adder 107 is supplied to the first frame memory 101. The motion compensation unit 106 performs a motion compensating process by using both motion information of a new VOP supplied from the demultiplex unit 104 and a reference VOP, thereby generating a predicted VOP. The adder 107 synthesizes the predicted VOP and an error picture output from the texture decoder unit 105, thereby generating a decoded VOP. The decoded VOP is supplied via the switching gate 108 to the first frame memory 101. The frame memory control unit 100 notifies the application control unit 501 of the end of the VOP process, the kind of the decoded VOP, and output time each time the decoding process on a VOP is completed.

Prior to the process of decoding the next VOP, the frame memory control unit 100 changes the roles of the first to third frame memories in accordance with the control signal 521 supplied from the application control unit 501. For example, when a command of storing the reference VOP has been received as the control signal 521, the frame memory control unit 100 switches the second frame memory 102 used for reference VOP this time to that for the virtual I-VOP, switches the first frame memory 101 used for decoding VOP to that for the reference VOP, and switches the third frame memory 103 in which a virtual I-VOP has been stored to that for a current VOP. When storage of a reference VOP is not instructed, the frame memory control unit 100 switches the second frame memory 102 for the use from the reference VOP to a current VOP, switches the first frame memory 101 for the use from the decoding VOP to a reference VOP, and holds a virtual I-VOP stored in the third frame memory 103 as it is. The output unit 504 outputs an image supplied from the second switching gate 109 to the path 513 onto the display screen in accordance with the output picture size, display timing, and time information supplied as the control signal 522.

In the embodiment, as described above, any one of the first to third frame memories is used for a virtual I-VOP, and the bitstream after the virtual I-VOP is stored in the memory 505. A change of the virtual I-VOP is designated in the form of a reference VOP storage command from the application control unit 501.

For example, on receipt of a recording start command from the user via the input device 508, the application control unit 501 supplies the control signals 523 and 521 to the switch 506 and the frame memory control unit 100, thereby to change the virtual I-VOP (storing the reference VOP) and to start the operation of storing a bitstream to the memory 505. When a recording operation is started in response to the instruction from the user, for example, due to a delay in a cache control of the application program or the like, there is the possibility that the recording start position is delayed from the screen desired by the user.

In the preferred embodiment of the invention, therefore, the application control unit 501 sets the switch 506 to be always ON while a moving picture is displayed, and executes a preliminary recording mode operation of periodically updating a stored bitstream and the virtual I-VOP by the control signals 520 and 521. In this operation mode, the virtual I-VOP is periodically updated in a predetermined cycle selected according to the storage capacity of the bitstream memory 505 and a control delay time. Each time the virtual I-VOP is updated, an unnecessary VOP sequence (coded data) stored in the bitstream memory 505 is made invalid and the bitstream memory 505 is sequentially updated with a newly received VOP sequence. When the recording start instruction is received from the user, the operation of periodically updating the virtual I-VOP is suppressed, and the operation mode is changed to a regular recording mode to store a received bitstream within the range of the storage capacity of the bitstream memory 505.

According to the method, prior to the recording start instruction from the user, the recording operation is executed. Consequently, when a recorded video play back instruction is issued from the user, moving pictures of predetermined period from the recording start screen desired by the user can be reproduced. For example, in the preliminary recording mode, a part of the bitstream memory capacity is assigned to periodically store coded data of a period of a few VOPs to tens VOPs for sufficiently compensating a response delay to the recording start instruction from the user. In response to the recording start instruction from the user, the operation mode is switched to the regular recording mode, the updating of the virtual I-VOP is stopped, and the whole remaining capacity of the bitstream memory 505 is used to store the subsequent coded data. In such a manner, according to the invention, a moving picture scene desired by the user can be recorded by effectively using the memory capacity.

In the regular recording mode, in preparation for reproduction of recorded data, time information corresponding to the recording start instruction and the recording end instruction issued from the user is stored. As the time information, information called "modulo_time_base" and "vop_time_increment" in the MPEG-4 can be used. The information is included in each VOP, modulo_time_base indicates the time in seconds and vop_time_increment denotes the time shorter than a second. The precision of vop_time_increment is set as "vop_time_increment_resolution" in each VOL header.

The modulo_time_base denotes a relative value with respect to seconds indicated by the preceding VOP and is expressed as a bit pattern including bits "1" of the number corresponding to the time difference on the second unitbasis. For example, when the time of a VOP coincides with that of the preceding VOP on the second unit basis, "0" is set. When the time of a VOP is different from that of the preceding VOP by one second, "10" is set. When the time of a VOP is different from that of the preceding VOP by two seconds, "110" is set.

The time of each VOP shorter than a second is expressed by vop_time_increment with the precision of vop_time_increment resolution. As the time information, therefore, it is sufficient to record the decoded value of vop_time_increment and the number of the bits "1" of modulo_time_base by applying the recording start VOP as a reference. With respect to modulo_time_base, the number of the bits "1" may be also used by applying the update start VOP as a reference.

Referring now to FIGS. 7 to 10, the operation of the MPEG-4 decoder 503 in the preliminary recording mode will be described in the case where P-VOP becomes a virtual I-VOP.

FIG. 7 shows an example of a received bitstream 300 supplied to the input buffer memory 502 via the switching gate 507. The received bitstream 300 is constructed by the I frame (I-VOP) 312 located immediately after the header information 311 and a plurality of P frames (P-VOPs) 331, 332, . . . , following the I frame 312. Reference numerals added to the reference characters I and P in the diagram denote frame numbers. It is now assumed that the P2 frame 332 in the bitstream is the recording start VOP, the P4 frame 334 is being displayed, and the P5 frame 335 is being decoded.

In this state, as shown in FIG. 8, coded data of the P5 frame and subsequent frames to be decoded is stored in the input buffer memory 502. When the third frame memory 103 is used for virtual I-VOP and stores the recording start VOP (P2 frame), the remaining first frame memory 101 and second frame memory 102 are alternately used as frame memories for current VOP and reference VOP. It is assumed now that, for example, the second frame memory 102 was used for current VOP in the cycle of decoding the P4 frame. In the cycle of decoding the P5 frame, the second frame memory 102 is used for the reference VOP, and decoded picture blocks in the P5 frame are sequentially stored into the first frame memory 101 for the current VOP. In the bitstream memory 505, the header information 311 necessary for analyzing the coded data and coded data of the P3 frame 333, which follows the P2 frame as the recording start VOP at present, and subsequent frames are sequentially stored.

Figure 9:
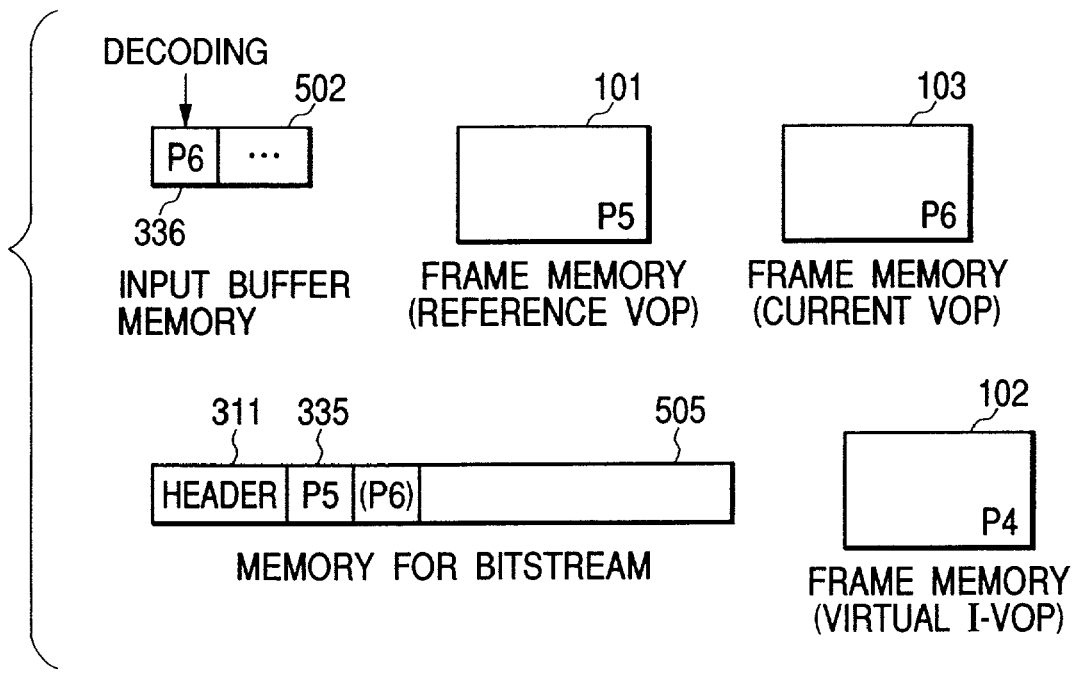
FIG. 9 is a diagram showing a state of the memory in the case where a virtual I-VOP update command is issued in the cycle of decoding the P5 frame in the received bitstream 300.

It is assumed that, on completion of decoding of the P5 frame, the updating of the virtual I-VOP is instructed by the control signal 521 from the application control unit 501. In this case, as shown in FIG. 9, the second frame memory 102 which has been used for the reference VOP so far is switched to that for the virtual I-VOP, the first frame memory 101 which has been used for the current VOP is switched to that for the reference VOP, and the third frame memory 103 which has been used for the virtual I-VOP is switched to that for a current VOP. Then the cycle of decoding the next P6 frame 366 is executed. At this time, the partial bitstream constructed by the coded data of the P3 and P4 frames stored in the bitstream memory 505 becomes invalid, and coded data of the P5 frame and subsequent frames, which follows the new virtual I-VOP (P4 frame) are stored instead of the P3 and P4 frames.

Figure 10:
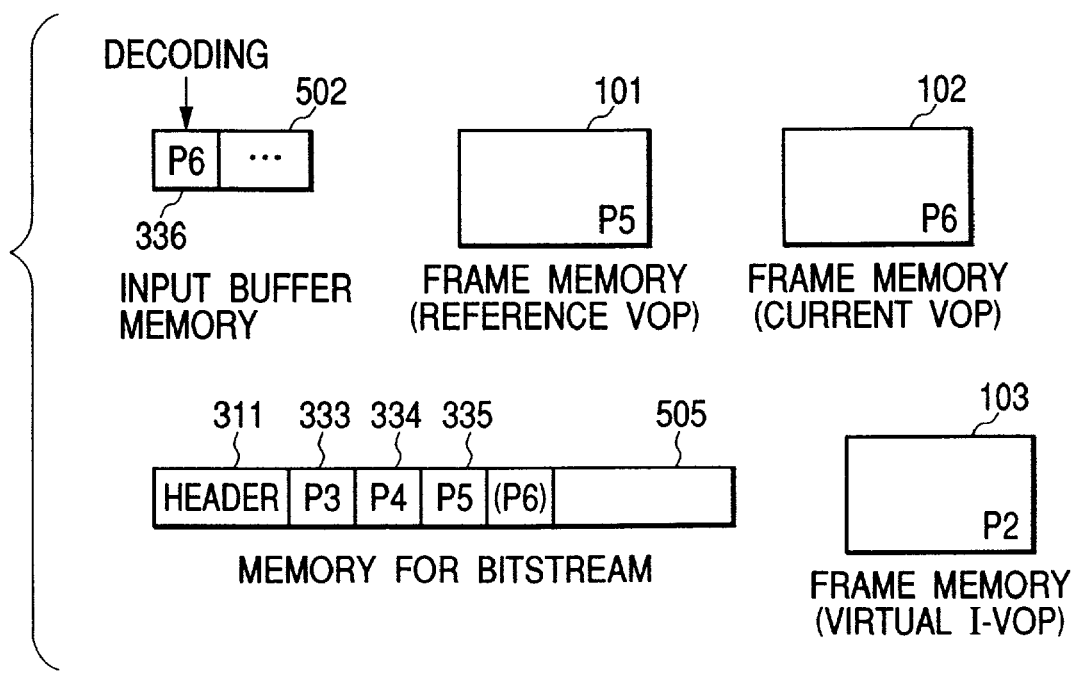
FIG. 10 is a diagram showing a state of the memory in the case where there is no virtual I-VOP update command in the cycle of decoding the P5 frame in the received bitstream 300.

At the time point the coding of the P5 frame is completed, if the application control unit 501 does not issue a virtual I-VOP update command, as shown in FIG. 10, the coded data of the P5 frame is additionally stored into the bitstream memory 505. By using the first frame memory 101 to store the reference VOP and the second frame memory 102 to store the current VOP, the cycle of decoding the P6 frame is executed.

As described above, in the preliminary recording mode, by periodically instructing the updating of the virtual I-VOP at predetermined frame intervals by the control signal 521 from the application control unit 501, the moving picture coded data (partial bitstream) of a predetermined period is repeatedly stored into the bitstream memory 505. When an instruction of the recording start is issued from the user, the operation mode is changed to the regular recording mode, and the storing of image data is continuously performed in a state where the automatic updating of the virtual I-VOP is suppressed.

In the regular recording mode, by repeating the operation described in FIG. 10, a subsequent bit sequence of the received moving picture is accumulated within the available capacity of the bitstream memory 505. When the recording end is instructed from the user while the accumulation of coded data is repeated in the regular recording mode, the stored moving picture coded data is preserved. In this case, the data storing operation can be re-started in the preliminary recording mode within the range of the remaining capacity of the bitstream memory 505. As long as a special instruction is not given from the user, the re-start of the preliminary recording mode may be suppressed.

When a play back instruction is issued from the user, the coded data stored in the bitstream memory 505 in the preliminary recording mode and the following regular recording mode is sequentially read out to the path 516 subsequent to the header information 311 and supplied to the MPEG-4 decoder 503 via the switching gate 507 and the input buffer memory 502. The coded data is decoded by using the virtual I-VOP as an initial picture by the MPEG-4 decoder 503, and a reconstructed picture is output on the display screen. After completion of the operation of reproducing all the recording data, the regular recording mode may be cancelled to automatically re-start the operation of the preliminary recording mode.

In order to clarify the contents stored in the bitstream memory 505, invalid data (P3 and P4 frames) is not shown in FIG. 9. In practice, it is also possible to use the memory area other than the storage area of the header 311 as a ring memory, write coded data of the P5 frame subsequent to the P4 frame as shown in FIG. 10, and memorize the head address of the P5 frame write area as a start address of an effective data area. In this case, at the time point the coded data is written in the last area of the bitstream memory 505, the write address is returned to the next location of the header 311, and new coded data is overwritten in the invalid data (P3 and P4 frames) area. The stored coded data sequence (bitstream) is read out from the start address of a valid data area when the recorded moving pictures are played back.

Referring now to FIGS. 11 to 14, the operation in the preliminary recording mode will be described in the case where an I-VOP is included in the P-VOP sequence in a received bitstream.

Figure 11:
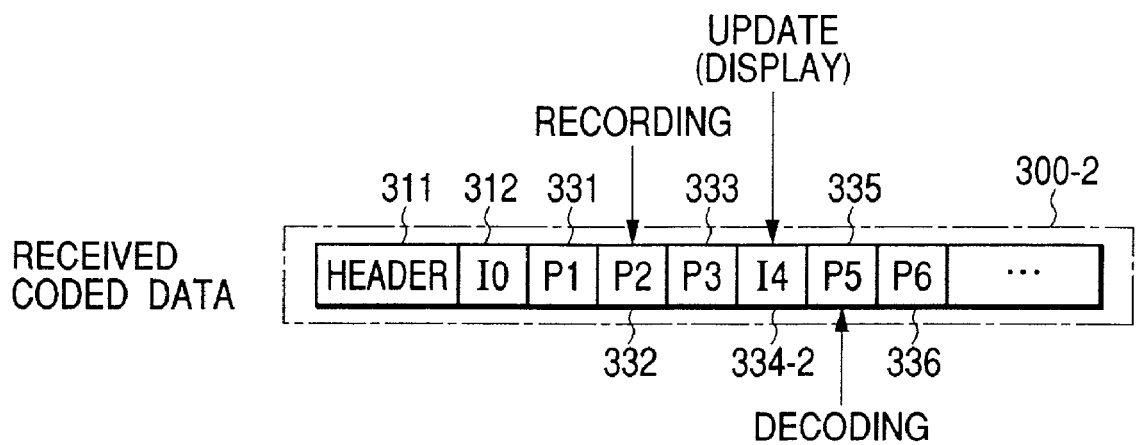
FIG. 11 is a diagram showing an example of a received bitstream 300-2 including a plurality of I-VOPs to be processed by the moving picture data processing system.

FIG. 11 shows an example of a received bitstream 300-2 by which an I-VOP may become a virtual I-VOP. The received bitstream 300-2 is different from the bitstream 300 shown in FIG. 7 with respect to the point that a fourth VOP 334-2 is an I-VOP (I4). It is now assumed that the P2 frame 332 is the recording start VOP, the I4 frame 334-2 is being displayed as a reference VOP, and the P5 frame 335 is being decoded at present.

Figure 12:
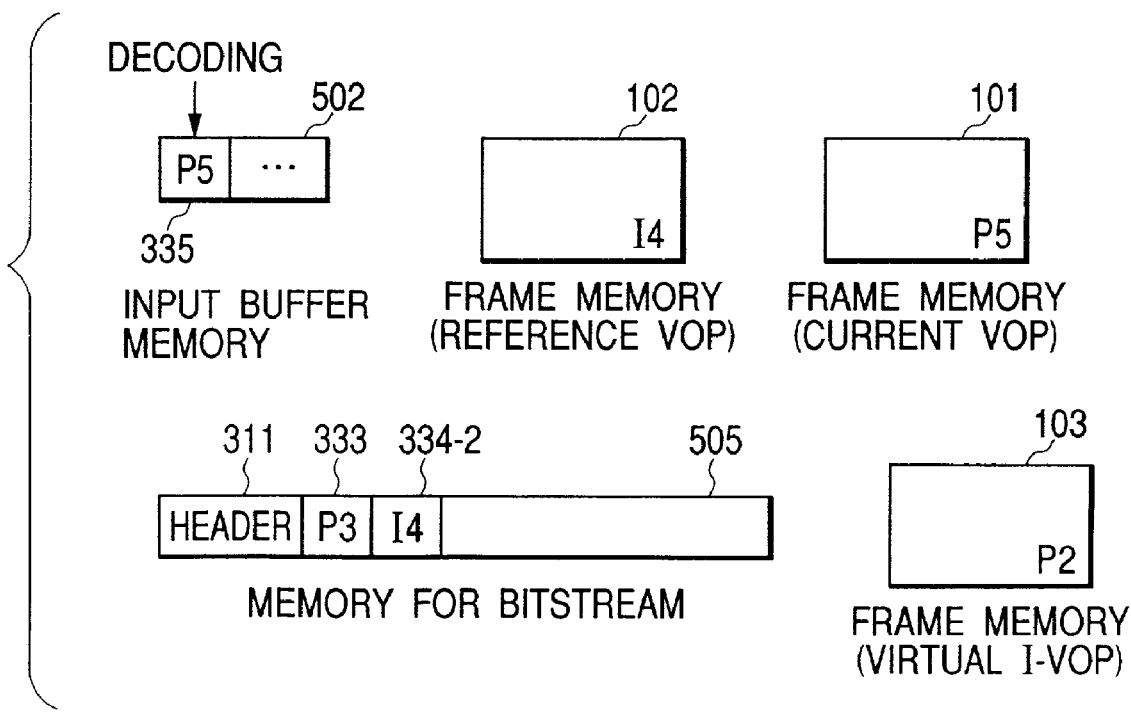
FIG. 12 is a diagram showing a state of the memory of the moving picture data processing system in the cycle of decoding a P5 frame in the received bitstream 300-2.

In this state, as shown in FIG. 12, coded data in the P5 frame and subsequent frames to be decoded is stored in the input buffer memory 502, the P2 frame is stored in the third frame memory 103 for the virtual I-VOP, the I4 frame is stored in the second frame memory 102 used for, for example, the reference VOP, the P5 frame is being decoded by referring to the I4 frame, and a decoded picture is sequentially stored in the first frame memory 101 for the current VOP. In the bitstream memory 505, the header information 311 and the coded data 333 and 334-2 of the P3 and I4 frames following the P2 frame as the recording start VOP are stored.

Figure 13:
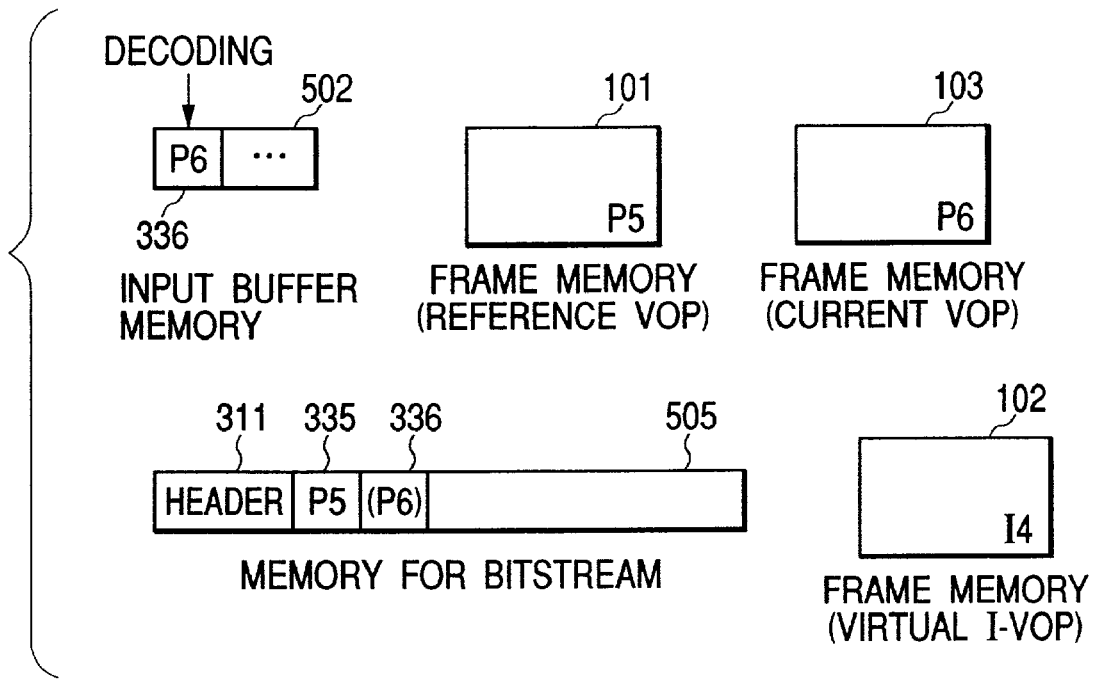
FIG. 13 is a diagram showing a state of the memory in the case where a virtual I-VOP update command is issued in the cycle of decoding the P5 frame in the received bitstream 300-2.

When the decoding is executed by using the I-VOP, for example, the I4 frame as a reference VOP, in the case where updating of a virtual I-VOP is instructed from the application control unit 501, as shown in FIG. 13, the second frame memory 102 in which the I4 frame is stored is used for a virtual I-VOP, the first frame memory 101 is switched for the use from the current VOP to a reference VOP, and the third frame memory 103 is switched for the use from the virtual I-VOP to a current VOP. In the bitstream memory 505, the coded data in the P3 and I4 frames stored so far is made invalid, and coded data in the frames (P5, P6, . . . ) subsequent to the virtual I-VOP (I4 frame) is sequentially stored.

Figure 14:
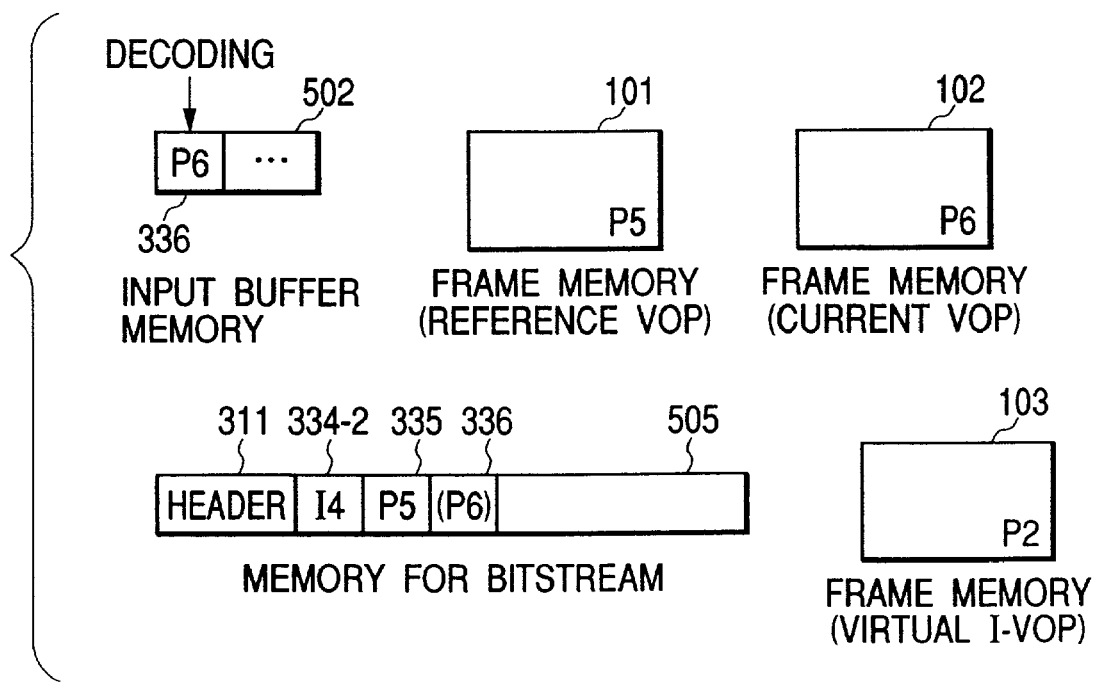
FIG. 14 is a diagram for explaining a modification of a virtual I-VOP update command in the cycle of decoding the P5 frame in the received bitstream 300-2.

As described above, when the I-VOP is stored as a virtual I-VOP, the application control unit 501 which has detected the contents of the virtual I-VOP may instruct the bitstream memory 505 to, for example as shown in FIG. 14, make coded data before the I4 frame invalid and to remain the coded data 334-2, 335, 336, . . . of the I4 frame and subsequent frames. In this case, when a play back instruction is issued from the user, the coded data of the P5 frame and subsequent frames is decoded by using the coded data of the I4 frame read out from the bitstream memory 505.

The process of playing back recorded data by the moving picture data processing system shown in FIG. 6 will now be described.

When an instruction of playing back the recorded data is received from the user via the input device 508, the application control unit 501 instructs the frame memory control unit 100 to play back the recorded data by the control signal 521. In response to the instruction, the frame memory control unit 100 supplies the switching control signal 112 to the switching gate 109 so that the data in the frame memory which is currently used for a virtual I-VOP is supplied as a reference VOP to the motion compensation unit 106, and supplies the switching control signal 111 to the switching gate 108 so that one of the remaining frame memories is used for a current VOP. The application control unit 501 generates the control signals 523, 524, and 525 subsequent to the recording and playing back instruction (control signal 521) to thereby clear the input buffer memory 502. In a state where data supply from the input buffer memory 502 to the bitstream memory 505 is interrupted, data read out from the bitstream memory 505 to the path 516 is supplied via the switching gate 507 to the input buffer memory 502.

As described in FIGS. 8 to 13, when the decoded data of the P-VOP (or I-VOP) is held in the frame memory for virtual I-VOP and coded data of the subsequent frame is stored in the bitstream memory 505, the coded data readout from the input buffer memory 502 is sequentially supplied to the MPEG-4 decoder 503, and decoding of the subsequent frame is started by using the picture frame of the P-VOP (or I-VOP) obtained from the frame memory for virtual I-VOP picture as a reference VOP. After that, by switching the frame memory for current VOP and the frame memory for reference VOP every frame, recorded data is played back one after another.

The reconstructed picture obtained in the frame memory for reference VOP is sequentially output to the output unit 504. It is also possible to check synchronous time of frames read out from the bitstream memory 505 by the application control unit 501 and control the output unit 504 by the control signal 522 so as to start displaying of recorded data from a frame at the time designated by the user.

As described by referring to FIG. 14, when the coded data starting from an I-VOP is stored in the bitstream memory 505, it is sufficient to omit the operation of controlling the switching gate 109 to connect the frame memory for virtual I-VOP to the motion compensation unit 106, and sequentially supply the coded picture data read out from the bitstream memory 505 to the MPEG-4 decoder.

Figure 1:
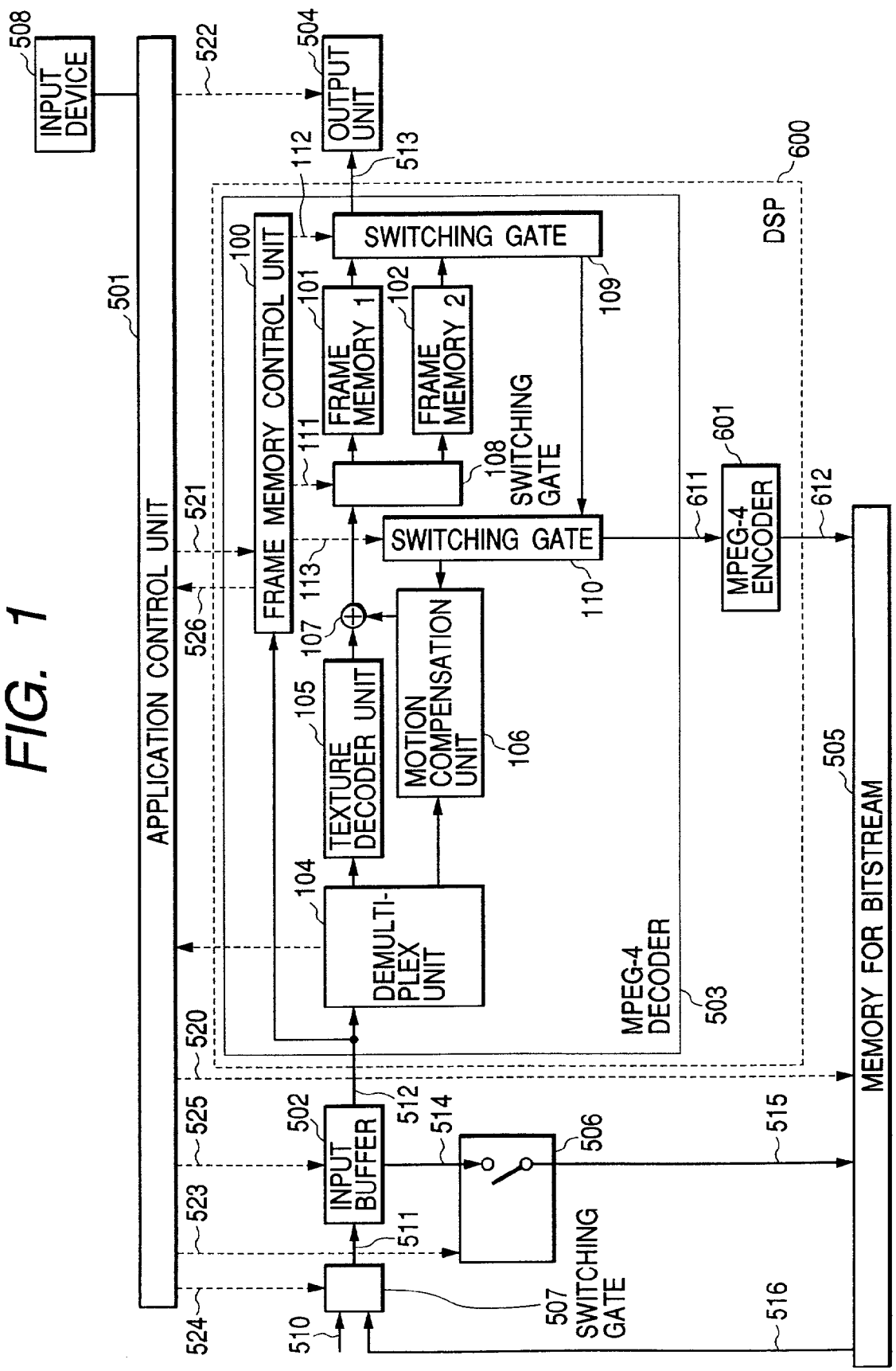
FIG. 1 is a diagram showing a moving picture data processing system according to an embodiment of the invention.

FIG. 1 shows a moving picture data processing system according to the second embodiment of the invention, in which a frame memory for storing a virtual I-VOP is omitted from an MPEG-4 codec. The embodiment is characterized in that an MPEG-4 encoder 601 is used in place of the frame memory for the virtual I-VOP, and a switching gate 110 for selectively supplying an output of the frame memory for reference VOP to the MPEG-4 encoder 601 is provided.

In the embodiment, one of the first and second frame memories 101 and 102 is used for current VOP, the other is used for reference VOP. The roles of the frame memories are switched alternately every frame. In each coding cycle, the output of the frame memory for reference VOP is supplied to the motion compensation unit 106, thereby decoding the received bitstream. By outputting the data in the frame memory for reference VOP to the output unit 504, the received moving picture is displayed.

The application control unit 501 in the preliminary recording mode periodically instructs the frame memory control unit 100 to update the virtual I-VOP by the control signal 521 in a manner similar to the first embodiment shown in FIG. 6. When the instruction of updating the virtual I-VOP is received, the frame memory control unit 100 switches the switching gate 110 in the cycle of decoding the next frame so that the output of the frame memory for reference VOP is supplied to both the motion compensation unit 106 and the MPEG-4 encoder 601.

The MPEG-4 encoder 601 performs intra-coding on a reference VOP supplied from the switching gate 110 via a path 611. The reference VOP intra-coded by the MPEG-4 encoder 601 is output as coded data including header information to a path 612 and is stored as a virtual I-VOP into the bitstream memory 505. When the MPEG-4 encoder 601 executes a process of coding the reference VOP with the same information as the header information already stored in the bitstream memory 505, it is not always necessary to store the newly generated header information. In this case, it is sufficient for the MPEG-4 encoder 601 to have only the intra-frame coding function.

For example, when a command of updating a virtual I-VOP is issued from the application control unit 501 on completion of a process of decoding the P4 frame, the frame memory control unit 100 supplies the P4 frame to the MPEG-4 encoder 601 in the cycle of decoding the P5 frame by using the P4 frame as a reference VOP.

Figure 15:
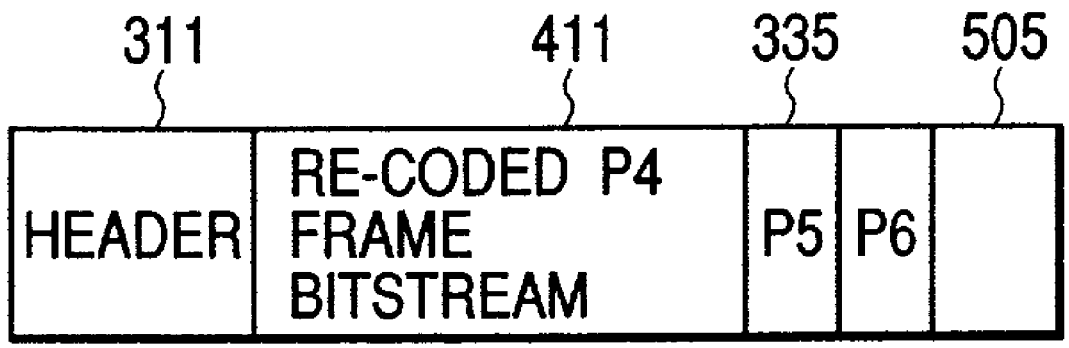
FIG. 15 is a diagram showing an example of a format of storing a re-coded virtual I-VOP into a bit stream memory 505.
Figure 16:
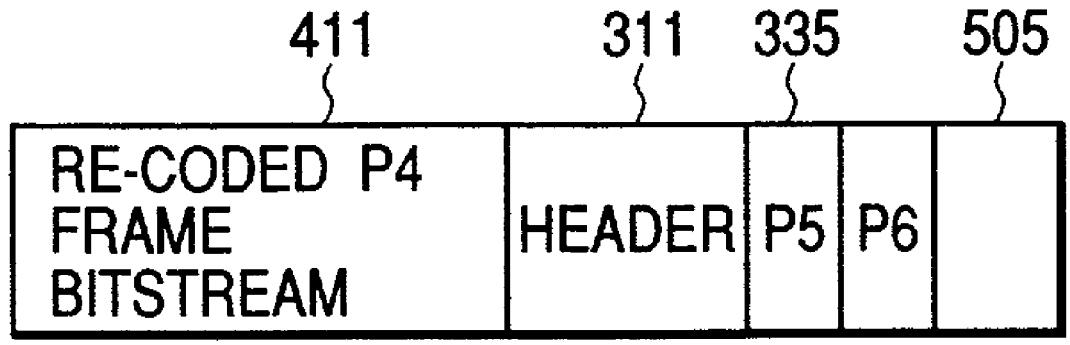
FIG. 16 is a diagram showing another example of a format of storing a re-coded virtual I-VOP into the bit stream memory 505.

Re-coded data or bitstream 411 of the P4 frame re-coded by the MPEG-4 encoder 601 is, for example, as shown in FIG. 15, written immediately after the header information 311 in the bitstream memory 505. The coded data or bitstream 335 of the P5 frame decoded this time and coded data 336, . . . of subsequent frames to be decoded after the P5 frame is written in the bit stream memory to follow the re-coded data 411. Alternately, for example, as shown in FIG. 16, the re-coded data or bitstream 411 may be located before the header information 311.

Since the stored location in the bitstream 411 is recognized by the application control unit 501 at the time of playing back the recorded data, it is able to read out the bitstream 411 of a virtual I-VOP first and to sequentially decode a bitstream of the next frame and subsequent frames by using the decoded VOP as a reference VOP. In the MPEG-4, re-transmission of header information is allowed. Consequently, as shown in FIG. 16, even when the header information 311 of the received coded data exists after the re-coded P4 frame data 411, the decoding process can be performed.

When the received bitstream includes an I-VOP frame other than the first I-VOP like the I4 frame 334-2 shown in FIG. 11, it is able to update the virtual I-VOP at the timing of decoding the I-VOP in addition to periodical update by operating the application control unit 501 to determine the kind of a VOP to be stored and to stop the supply of data to the MPEG-4 encoder 601 in the decoding cycle in which the I-VOP frame is used as a reference VOP. In this case, the data in the bitstream memory 505 is updated, for example, in a format described in FIG. 14.

Figure 17:
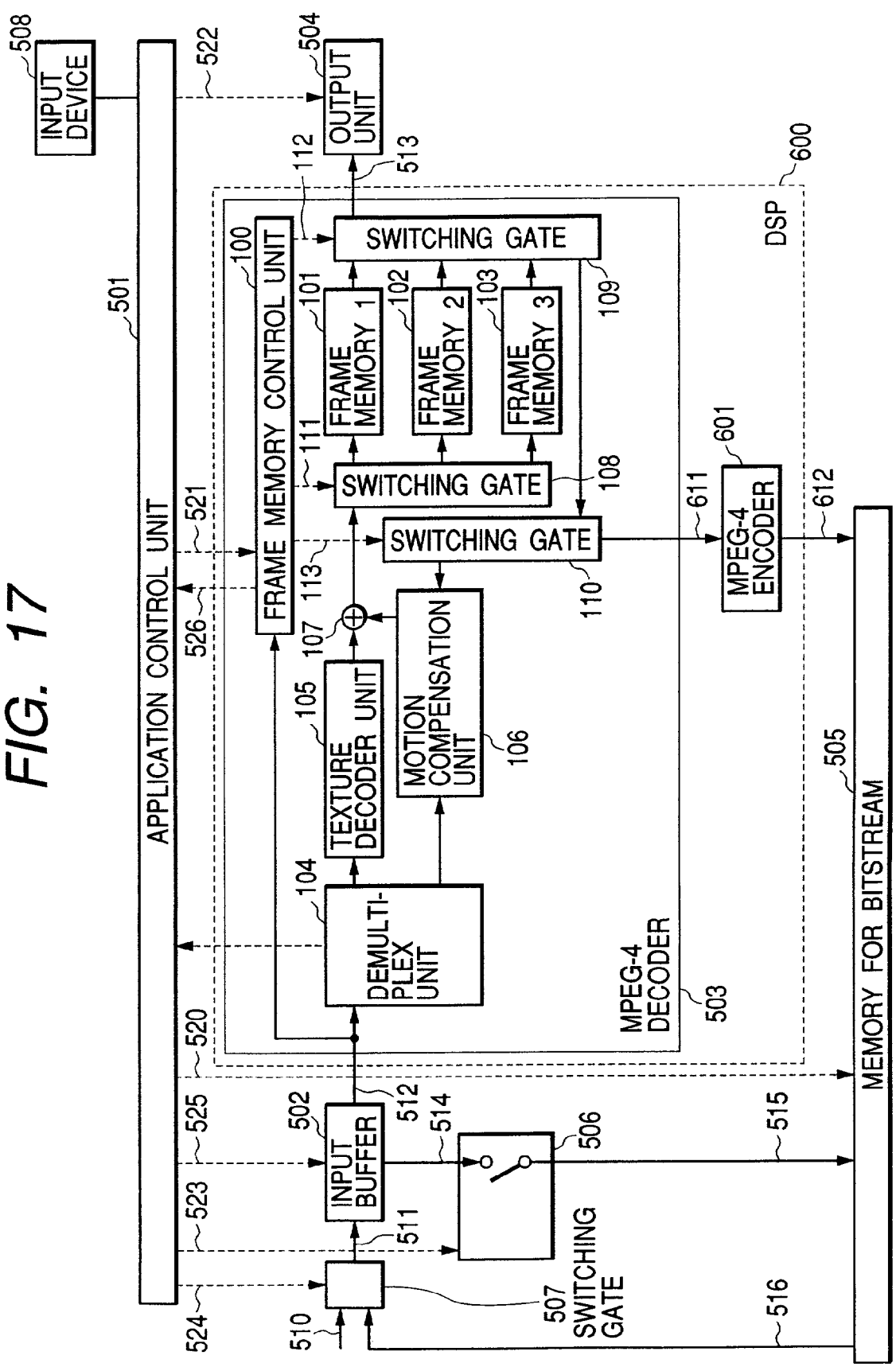
FIG. 17 is a diagram showing a moving picture data processing system according to a third embodiment of the invention.

FIG. 17 shows a moving picture data processing system according to a third embodiment of the invention.

The embodiment has a structure in which the MPEG-4 decoder 503 has the three frame memories 101 to 103 for current VOP, reference VOP, and virtual I-VOP, respectively, and the MPEG-4 encoder 601 is further added.

According to the embodiment, it is able to adopt a control procedure of re-coding a reference VOP data at an arbitrary timing after storing the reference VOP to the frame memory for virtual I-VOP, and storing the resultant as a virtual I-VOP to the bitstream memory 505.

In the foregoing first and second embodiments, the frame memory for virtual I-VOP can be also used as a frame memory for temporarily stopping the motion of a moving picture displayed on the output unit 504. For example, when a request of temporarily stopping the display is issued from the user, the frame memory for reference VOP currently output on the screen is switched to the frame memory for virtual I-VOP by the switching gate 111, and the switching gate 109 is switched so as to output the data in the frame memory for virtual I-VOP picture to the output unit 504. By the switching operation, outputting the moving picture to the display is temporarily stopped, thereby to display a still picture on the screen.

During the display stop period, the process of decoding the received bitstream may be interrupted. Instead of this, the process of decoding the received bitstream may be continued using the other two frame memories. In the latter case, since the contents of the frame memory for reference VOP is supplied to the motion compensation unit 106 and used only for the process of decoding the next frame, the contents of the reference VOP is not reflected to the output unit 504. It is also possible to continue the storing operation of the received bitstream in the bitstream memory 505 during the display stop period, and to stop the decoding process at the time point the bitstream memory becomes full.

In the case where the input buffer memory 502 has a relatively large capacity, it is also possible to store a bitstream received during the display stop period into the input buffer memory 502 and, at the time point the input buffer memory 502 becomes full, to release the display from the temporary stop. In the case where a picture distributing server has the function of temporarily stopping the distribution of data in accordance with the temporary stop request from a terminal apparatus, the application control unit 501 may request the picture distributing server to temporary stop the data distribution when the user instructs temporary stop of the display and re-start the picture distributing operation when the user withdraws the temporary stop of the display.

The function of temporary stopping the display can be also used at the time of playing back the recorded data. For example, a picture on the screen is fixed in response to a display temporary stop request issued from the user when recorded data is being reproduced, and the playback of succeeding frames is re-started in response to a stop cancellation request from the user, thereby to providing the user with a chance to fully examine a specific recorded scene.

In order to retrieve a specific scene from recorded data, the function of intermittent frame advancing is effective. For example, in the case where the user instructs playback of recorded data frame by frame, the frame memory control unit 100 automatically sets a pause period between decoding cycles, and switches the contents of the display at intervals to the extent that the pictures on the display can be recognized frame by frame. In this case, the display switching interval may be varied according to an instruction from the user. The recorded data can be also advanced frame by frame in accordance with an instruction from the user. The retrieved image may be captured to display as a background screen of the user interface.

Figure 18:
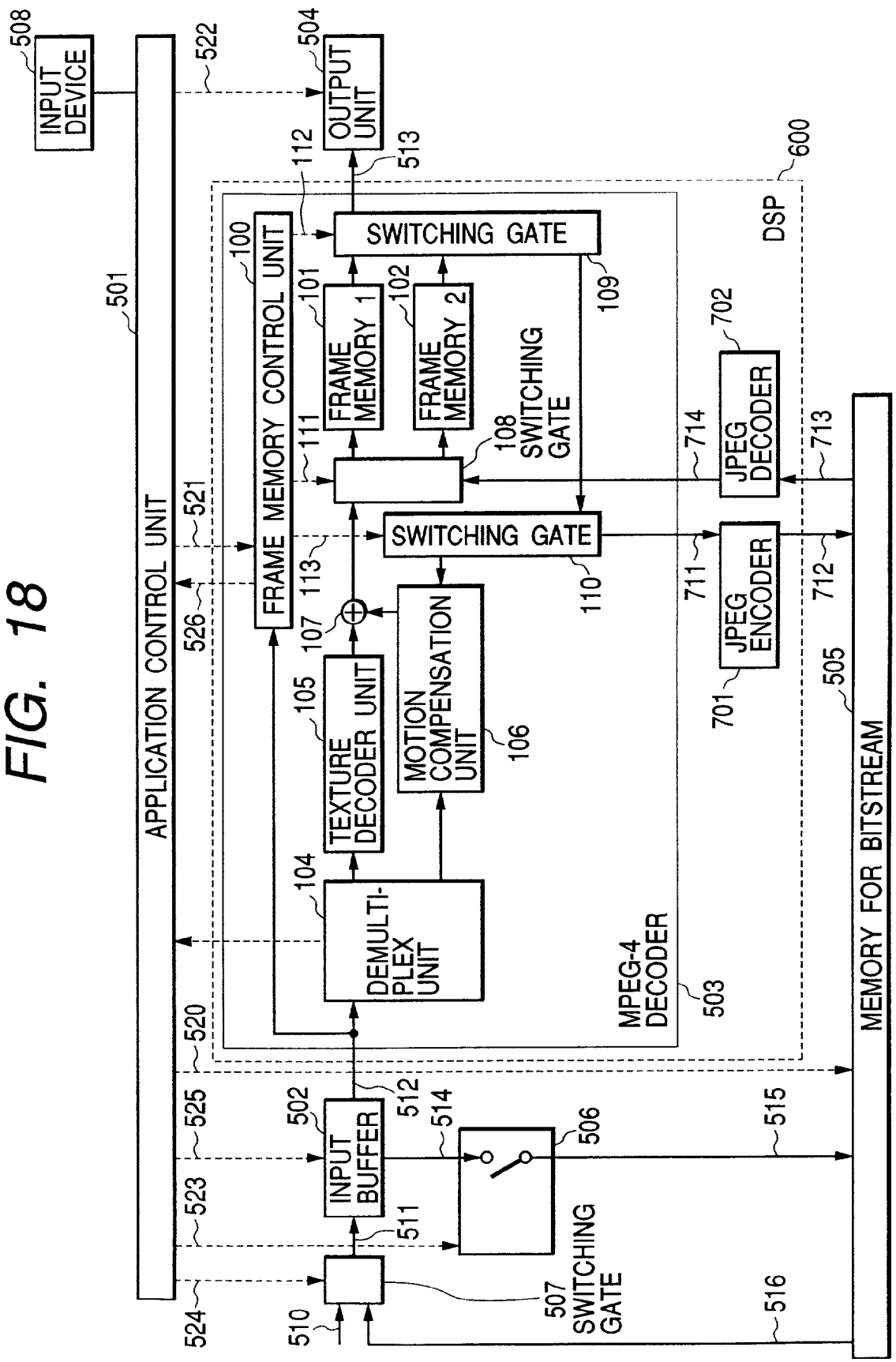
FIG. 18 is a diagram showing a moving picture data processing system according to a fourth embodiment of the invention.

FIG. 18 shows a moving picture data processing system according to a fourth embodiment of the invention.

In the foregoing second and third embodiments, a reference VOP to be stored as a virtual I-VOP is re-coded by the MPEG-4 encoder 601 and the resultant data is stored in the bitstream memory 505. By using the same coding system of the virtual I-VOP as that of succeeding frames stored in the bitstream memory 505, these embodiments make it possible the same MPEG-4 decoder 503 to process all of recorded data read out from the bitstream memory 505.

It is, however, also possible to preliminarily encode the virtual I-VOP by a coding system different from that of the received bitstream, decode only the virtual I-VOP by a decoding system different from that used for the subsequent frames at the time of playing back the recorded data, and reconstruct the subsequent frames by using the decoded virtual I-VOP as a reference VOP.

In the fourth embodiment shown in FIG. 18, a JPEG encoder 701 known as a still picture coding system is used in place of the MPEG-4 encoder 601 of the moving picture coding system shown in FIG. 1 to generate a virtual I-VOP. Specifically, picture data of the frame memory 101 or 102 for reference VOP is re-coded by the JPEG system and the resultant is stored as a virtual I-VOP into the bitstream memory 505. The coded data of the frames subsequent to the virtual I-VOP, which is in the MPEG-4 system is stored in the bitstream memory 505.

At the time of playing back recorded data, the virtual I-VOP is read out from the bitstream memory 505 to a path 713, and the virtual I-VOP decoded by a JPEG decoder 702 is set in the frame memory 101 or 102 for reference VOP by the switching gate 108. The coded data of the subsequent frames is read out from the bitstream memory 505 and sequentially decoded by the MPEG-4 decoder 503 using the virtual I-VOP as an initial picture. By re-coding the virtual I-VOP by the encoder of the still picture coding system as described above, the size of the coded data of the virtual I-VOP can be further compressed.

The system of the fourth embodiment can be also similarly applied to the moving picture processing system having three frame memories shown in FIG. 17. As the encoding and decoding system of the virtual I-VOP except for the JPEG, for example, an MPEG-4 still picture coding system, other coding/decoding systems such as ZIP, and compression tools may be also applicable.

Figure 3:
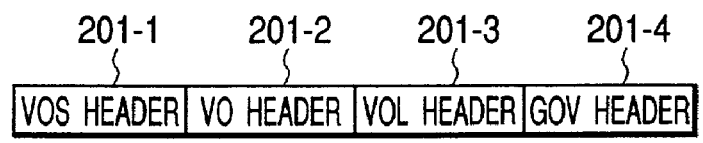
FIG. 3 is a diagram showing the structure of a sequence header of an MPEG-4 bitstream.
Figure 4:
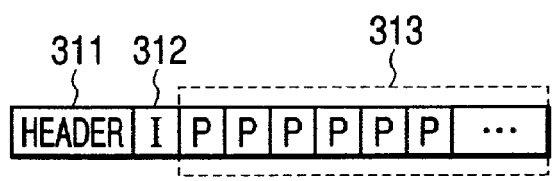
FIG. 4 is a diagram showing an example of a data structure of an MPEG-4 bitstream applied to radio communication.
Figure 5:
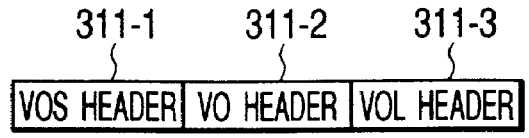
FIG. 5 is a diagram showing the structure of a sequence header of an MPEG-4 bitstream applied to radio communication.

Although the received bitstream is coded by the MPEG-4 in the above-described embodiments, in the moving picture data processing system of the invention, by making the decoder 503 compliant with the coding system of the received bitstream, for example, moving picture data compressed in other coding systems such as MPEG-1, MPEG-2, H.261, and H263 can be also processed. Although the header information shown in FIG. 3 does not exist according to a coding system, it is sufficient in this case to omit decoding of the header information and storage of the header information to the bitstream memory.

In the foregoing embodiments, the contents of the frame memory for reference VOP is supplied to the motion compensation unit 106 and the output unit 504. When a recording start instruction is given from the user, the data in the frame memory for reference VOP corresponding to the displayed screen is regarded as a recording start picture, time information accompanying the reference VOP is stored, and playback of recorded data is controlled. In consideration of the delay in the user operation with respect to the displayed screen, however, when the recording start instruction is given from the user, a frame preceding the reference VOP may be dealt as a recording start screen.

It is also possible to prepare not only the frame memories for current VOP and reference VOP but also a frame memory for presentation VOP for storing a picture to be output to the screen, and switch the usage of the frame memories in accordance with the order of current VOP, reference VOP, presentation VOP, current VOP, . . . in normal times. At the time of updating the virtual I-VOP, the frame memory for presentation VOP may be switched to that for virtual I-VOP, and the frame memory for virtual I-VOP may be used as the frame memory for current VOP.

In the case where the frame memory for presentation VOP and the frame memories for reference VOP and current VOP related to the decoding process are separate from each other, the decoding process and the displaying process can be completely separated from each other. Consequently, for example, when it becomes necessary to change the data in the frame memory for presentation VOP due to the convenience of the output unit, an adverse influence can be prevented from being exerted on the decoding process. In the above frame memory structure, for example, if the contents of the frame memory for reference VOP is output to the screen and the frame memory for presentation VOP is used to store the previous presentation VOP, when the user issues a recording instruction, a frame immediately preceding to the frame currently displayed on the screen can be stored as a recording start VOP or virtual I-VOP.

A user interface for instructing recording of distributed moving picture data, reproduction of recorded data, and temporary stop of a playback screen will now be described.

Figure 19:
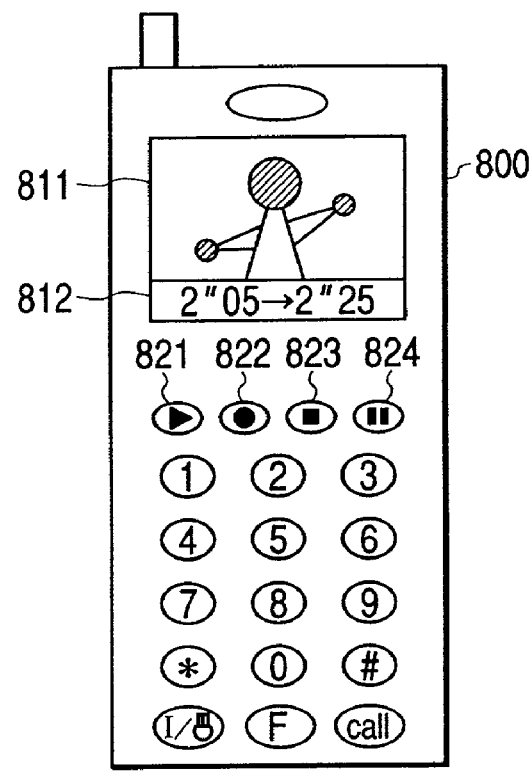
FIG. 19 is a diagram showing an example of a user interface of a cellular terminal according to the invention.

FIG. 19 shows an example of an operation board of a cellular telephone terminal 800 having a playback button 821, a recording button 822, a stop button 823, and a temporary stop button 824 as operation buttons dedicated for video processes.

The playback button 821 is used to receive, for example, video data retrieved when the user makes a Web search or the like and to reproduce the video data on a screen 811 or to play back recorded coded data. When the playback button 821 is pressed, the application control unit 501 starts the DSP 600 and a program for controlling moving picture reproduction to output decoded pictures onto the screen 811 as a part of the output unit 504. In a time display area 812, an elapsed time (2.25 seconds) since the start of the reproduction is displayed every moment.

The recording button 822 is used to instruct recording start to the MPEG-4 decoder. In the case where the user operates the recording button 822 to instruct video recording while the MPEG-4 decoder is recording received pictures in the preliminary recording mode while periodically updating a stored VOP (virtual I-VOP) the application control unit 501 stops the periodic updating of the stored VOP, stores synchronous time accompanying the coded data of the recording start frame which is a picture frame being currently displayed, and starts the recording operation to record moving pictures received thereafter into the bitstream memory 505 in the regular recording mode. The stored synchronous time is displayed as recording start time in the time display area 812. The example shown in the diagram indicates that the video recording is started after elapse of 2.05 seconds from the start of reproducing the received pictures.

As methods of playing back recorded data, for example, there are a method of playing back recorded data stored in the bitstream memory 505 from the head VOP and a method of playing back recorded data from a VOP at the recording time (recording start synchronous time) instructed by the user. Usually, it is sufficient to play back recorded data from a VOP at the recording start synchronous time, and play back recorded data from the head VOP only when the user specially designates the time.

The stop button 823 is used to stop the operation of playing back the received picture, a recording operation, and a playback operation. When the stop button 823 is operated during the recording operation, synchronous time accompanying the coded data being decoded at that time is stored and displayed as recording end time in the time display area 812, and an end code is recorded after the last frame (coded data) recorded in the bitstream memory. If it is feared that the bitstream memory 505 is going to overflow with data during the recording operation in the regular recording mode, the recording may be automatically finished without waiting for the recording stop instruction from the user, but the recording end time is displayed.

When the time display area 812 is narrow, the recording end time may be displayed, for example, in place of the recording start time. A method of stopping display of synchronous time of a current VOP indicative of elapsed time to temporarily display the recording end time, or the like may be also adopted.

The temporary stop button 824 is used to temporarily stop the operation of playing back a received or recorded picture to still the picture on the screen. The MPEG-4 decoder 503 may continue the decoding process as described above during the period in which play back of the received picture is stilled. When the temporary stop button 824 is pressed again, the temporary stop state is escaped and the playback operation is re-started. The intermittent frame advancing on the screen can be instructed by, for example, pressing the playback button 821 in the temporary stop state. An instruction of returning the operation to the regular playback mode from the intermittent frame advancing state can be given by, for example, the operation of pressing the temporary stop button and then the playback button.

Figure 20:
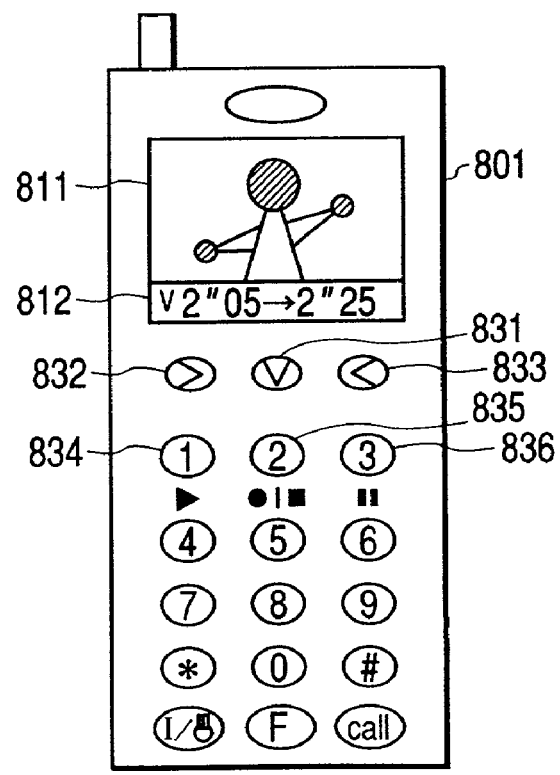
FIG. 20 is a diagram showing another example of a user interface of a cellular terminal according to the invention.

FIG. 20 shows an example of an operation board of the cellular telephone terminal 801 wherein the functions of buttons 821 to 824 dedicated to video-related operations shown in FIG. 19 are assigned to numeral numbers.

Reference numeral 831 denotes a video button. By pressing the video button 831, the terminal enters a video mode (received moving picture output mode), and a reference character "V" indicative of the video mode is displayed in the time display area 812. When the terminal enters the video mode, an input button 834 of numeral 1 functions as a playback button, an input button 835 of numeral 2 functions as a recording/stop button, and an input button 836 of numeral 3 functions as a temporary stop button. Reference numerals 832 and 833 function as volume buttons. The button 832 functions as an intermittent frame advancing button during a temporary stop.

The user interfaces shown in FIGS. 19 and 20 are just examples. In the moving picture recording and playback control according to the invention, obviously, a control instruction from the user can be supplied by another arbitrary input method such as an icon selecting method or other button operating method.

Although the embodiments of the invention have been described above, the invention includes modifications as described hereinbelow.

Figure 2:
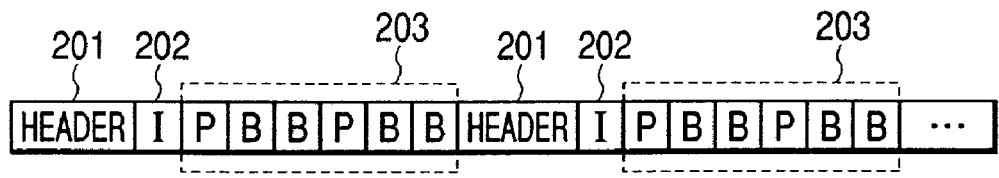
FIG. 2 is a diagram showing an example of a data structure of the MPEG-4 as a moving picture bitstream.

(1) The received bitstream may be, as shown in FIG. 2, coded data including a B-VOP at some midpoint. When the head of coded data to be stored in the bitstream memory is a B-VOP, coded data of the head VOP and a plurality B-VOPs subsequent to the head VOP can be excluded from the target to be stored. If it is desired to decode and display B-VOPs, another frame memory for reference VOP has to be additionally provided.

(2) The received bitstream may be pictures of an arbitrary shape other than the rectangular pictures. In the MPEG-4, however, a shape type of a coded block of a reference VOP is necessary. Consequently, in the case of decoding a bitstream of pictures other than the rectangular pictures, it is necessary to record synchronous time information of coded data and the shape type of each coded block at the time of updating the virtual I-VOP and at the time of recording start.

(3) In the case of storing a new virtual I-VOP into a bitstream memory, a preceding bitstream which becomes unnecessary is made invalid in the embodiment. It is also possible to store a plurality of successive sets of bitstreams, each set constructed by bitstreams of one virtual I-VOP and a plurality of VOPs subsequent to the virtual I-VOP, into a bitstream memory and sequentially make the bitstreams invalid from the oldest set.

(4) The update of the virtual I-VOP in the preliminary recording mode may depend on the size of recorded data stored in the bitstream memory in place of being performed in a fixed cycle determined by the number of VOPs. That is, it is also possible to set the upper limit value of the memory capacity used in the preliminarily recording mode and, to update a virtual I-VOP with a new bit stream in the next decoding cycle when an amount of stored data exceeds the upper limit value.

(5) The following method may be also used. When the bitstream memory becomes full in the regular recording mode, synchronous time T1 accompanying the head VOP of a subsequent bitstream which becomes unable to be accumulated is stored. On receipt of a recording end instruction from the user, synchronous time T2 accompanying the last VOP in the subsequent bitstream is stored. At the time of playing back recorded data, an insufficient bitstream specified by the time information (T1 and T2) may be re-transmitted by a file transfer protocol from a picture server. Another method can be also employed. Synchronous time T0 accompanying a VOP following the virtual I-VOP is stored. When the bitstream memory becomes full before an instruction of the recording end is received from the user, bitstreams in the recording range specified by the T0 and the T2 are re-transmitted from a picture server. The bitstreams may be decoded by using the virtual I-VOP held on the terminal side as a start point. As described above, by using the function of re-transmitting a bitstream from the picture server, the playback of recorded data more than the storage capacity of the bitstream memory can be realized.

(6) In the embodiment, as information for identifying the recording start frame and the recording end frame designated by the user, synchronous time "modulo_time_base" and "vop_time_increment" accompanying each picture frame (VOP) in the received bit sequence is used. In place of the synchronous time, for example, other information such as a frame number may be also applicable. Instead of the recording start instruction of the user, it is also possible to pre-register characteristic information of a scene to be recorded, automatically start the regular recording mode at the time point a picture having the characteristics is decoded or reproduced, and automatically record moving pictures of an amount corresponding to predetermined time.

As obviously understood from the above description, according to the invention, a decoded picture selected at an arbitrary position in a received bitstream is stored as a virtual intra-frame coded picture (virtual I-VOP), and coded picture data of subsequent frames is decoded by using the virtual I-VOP as an initial picture, thereby enabling a scene desired by the user to be efficiently recorded and played back from a moving picture coded data sequence having no intra-frame coded picture for random access at some midpoint or to which an intra-frame coded picture for random access is inserted not frequently.

What is claimed is:

1. A method of recording and playing back moving picture data, comprising the steps of:
    storing an arbitrarily selected decoded picture as a virtual intra-frame coded picture while a received bitstream of a moving picture coded data sequence is decoded to display reconstructed pictures;
    recording a partial bitstream as recording data capable of producing reconstructed pictures of a specific period subsequent to a decoded picture dealt as said virtual intra-frame coded picture;
    in a preliminary recording mode of operation, periodically updating said virtual intra-frame coded picture in a predetermined cycle and newly recording a part of said received bitstream which becomes said recording data each time the virtual intra-frame coded picture is updated; and
    in a regular recording mode of operation, suppressing the update of said virtual intra-frame coded picture and continuing the operation of recording a part of said received bitstream in response to a recording instruction from the user.

2. A method of recording and playing back moving picture data according to claim 1, wherein coded data obtained by re-coding said decoded picture is stored as said virtual intra-frame coded picture.

3. A method of recording and playing back moving picture data according to claim 2, wherein said decoded picture is re-coded in a coding system different from that of said received bitstream.

4. A method of recording and playing back moving picture data according to claim 1, further comprising the step of recording header information included in said received bitstream as a part of recording data and updating recorded header information each time new header information is received.

5. A method of recording and playing back moving picture data according to claim 1, further comprising the step of starting a process of decoding said recorded data by using said virtual intra-frame coded picture as an initial picture in response to a playback instruction from the user.

6. A terminal apparatus for receiving a bitstream of a moving picture coded data sequence and displaying the bitstream as moving pictures, comprising:
    a decoder for decoding said received bitstream;
    a storage for selectively storing a part of said received bitstream as recorded data;
    a controller for controlling writing and reading out of recorded data to and from said storage, said controller having means for selecting an arbitrary decoded picture from a group of decoded pictures generated by said decoder, storing the selected picture as a virtual intra-frame coded picture, and writing header information extracted from said received bitstream and a part of bitstream for producing reconstructed pictures of a specific period subsequent to said virtual intra-frame coding picture as recorded data into said storage; and
    an input device for receiving instructions from a user, wherein said controller includes means for selectively executing when said moving pictures are displayed;

a preliminarily recording mode of operation for periodically updating said virtual intra-frame coded picture in predetermined cycles and newly recording a partial received bitstream into said storage each time the virtual intra-frame coded picture is updated; and a regular recording mode of operation for suppressing the operation of updating said virtual intra-frame coded picture and continuing the operation of recording said partial received bitstream in response to a recording instruction from the user.

7. A terminal apparatus according to claim 6, further comprising an input device for receiving instructions from a user, wherein said controller controls selection of said decoded picture and writing of said bitstream to said storage in response to an instruction from the user.

8. A terminal apparatus according to claim 7, wherein said controller sets said virtual intra-frame coded picture as an initial picture to said decoder and starts supplying a bitstream read out from said storage to said decoder in response to a playback instruction from the user.

9. A terminal apparatus for receiving a bitstream of a moving picture coded data sequence and displaying the bitstream as moving pictures, comprising:
a decoder for decoding said received bitstream;
a storage for selectively storing a part of said received bitstream as recorded data; and
a controller for controlling writing and reading out of recorded data to and from said storage,
said controller having means for selecting an arbitrary decoded picture from a group of decoded pictures generated by said decoder, storing the selected picture as a virtual intra-frame coded picture, and writing header information extracted from said received bitstream and a part of bitstream for producing reconstructed pictures of a specific period subsequent to said virtual intra-frame coding picture as recorded data into said storage,
wherein said decoder has first, second, and third frame memories, decodes said received bit stream on a frame unit basis by alternately switching two of said frame memories assigned for a reference picture and a current picture in normal times and, in response to an instruction from said controller, stores a virtual intra-frame coded picture by switching the frame memory used for reference picture to that for a virtual intra-frame coded picture and switching the frame memory used for virtual intra-frame coded picture so far to that for a current picture.

10. A terminal apparatus according to claim 7, further comprising an encoder for encoding a picture, wherein said controller re-codes said selected decoded picture by said encoder, thereby storing said virtual intra-frame coded picture in the form of coded data.

11. A method of recording moving picture data, comprising the steps of:
periodically receiving a bitstream of moving picture coded data which includes first intra-frame coded pictures;
decoding the moving picture coded data in the received bitstream and periodically generating second intra-frame coded pictures with a cycle shorter than that of the first intra-frame coded pictures inserted in the received bitstream;
storing each of the second intra-frame coded pictures in a memory; and
when a recording start instruction is received, recording a partial bitstream of moving picture coded data subsequent to a coded picture corresponding to the second intra-frame coded picture stored in said memory.

12. A method of recording moving picture data, comprising the steps of:
periodically receiving a bitstream of moving picture coded data which includes first intra-frame coded pictures;
decoding the moving picture coded data in the received bitstream and periodically generating second intra-frame coded pictures with a frequency higher than a frequency with which the first intra-frame coded pictures appear in the received bitstream;
storing each of the second intra-frame coded pictures in a memory; and
when a recording start instruction is received, recording a partial bitstream of moving picture coded data subsequent to a coded picture corresponding to the second intra-frame coded picture stored in said memory.

13. The method of recording moving picture data according to claim 11, wherein each of said second intra-frame coded pictures is generated from an arbitrary one of coded pictures in said received bitstream.

14. The method of recording moving picture data according to claim 11, wherein
said bitstream includes inter-frame coded pictures following said first intra-frame coded picture, and
each of said second intra-frame coded pictures is generated from an arbitrary one of the inter-frame coded pictures in the received bitstream.

15. A moving picture data recording apparatus, comprising:
a receiving unit for periodically receiving a bitstream of moving picture coded data which includes first intra-frame coded pictures;
a generating unit for decoding the moving picture coded data in the bitstream received by the receiving unit and periodically generating second intra-frame coded pictures with a cycle shorter than that of the first intra-frame coded pictures in the received bitstream;
a memory for storing each of the second intra-frame coded pictures until a next one is supplied; and
a recording unit for when a recording start instruction is received, recording a partial bitstream of moving picture coded data subsequent to a coded picture corresponding to the second intra-frame coded picture stored in said memory.

16. A moving picture data recording apparatus, comprising:
a receiving unit for periodically receiving a bitstream of moving picture coded data which includes first intra-frame coded pictures;
a generating unit for decoding the moving picture coded data in the bitstream received by the receiving unit and periodically generating second intra-frame coded pictures with a frequency higher than a frequency with which the first intra-frame coded pictures appear in the received bitstream;
a memory for storing each of the second intra-frame coded pictures until a next one is supplied; and
a recording unit for when a recording start instruction is received, recording a partial bitstream of moving picture coded data subsequent to a coded picture corresponding to the second intra-frame coded picture stored in said memory.

17. The moving picture data recording apparatus according to claim 15, wherein said generating unit generates each of said second intra-frame coded picture from an arbitrary one of coded pictures in said received bitstream.

18. The moving picture data recording apparatus according to claim 15, wherein
said bitstream includes inter-frame coded pictures, and
said generating unit generates each of said second intra-frame coded pictures from an arbitrary one of the inter-frame coded pictures in the received bitstream.

19. A portable terminal apparatus with a function of recording moving picture data, comprising:
a receiving unit for periodically receiving a bitstream of moving picture coded data which includes first intra-frame coded pictures;
a frame generating unit for decoding the moving picture coded data in the bitstream received by the receiving unit and periodically generating second intra-frame coded pictures with a cycle shorter than that of the first intra-frame coded pictures in the received bitstream;
a memory for storing each of the second intra-frame coded pictures until a next one is supplied; and
a recording unit for when a recording start instruction is received, recording a partial bitstream of moving picture coded data subsequent to a coded picture corresponding to the second intra-frame coded picture stored in said memory.

20. The portable terminal apparatus according to claim 19, wherein said receiving unit receives said bitstream of moving picture coded data through a wireless circuit.

* * * * *